(12) United States Patent
Lopez et al.

(10) Patent No.: US 8,235,861 B2
(45) Date of Patent: Aug. 7, 2012

(54) SPLIT TORQUE COMPOUND PLANETARY DRIVETRAIN FOR WIND TURBINE APPLICATIONS

(75) Inventors: Fulton Jose Lopez, Clifton Park, NY (US); Aniruddha Dattatraya Gadre, Rexford, NY (US); Darren Lee Hallman, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 932 days.

(21) Appl. No.: 12/290,488

(22) Filed: Oct. 30, 2008

(65) Prior Publication Data
US 2010/0113210 A1 May 6, 2010

(51) Int. Cl.
*F16H 57/08* (2006.01)
(52) U.S. Cl. ........................................................ 475/331
(58) Field of Classification Search ............... 475/331
See application file for complete search history.

(56) References Cited

U.S. PATENT DOCUMENTS

| | | | |
|---|---|---|---|
| 6,607,464 B1 | 8/2003 | Bauer et al. | |
| 6,945,901 B2 | 9/2005 | Flamang | 475/331 |
| 7,008,348 B2 | 3/2006 | LaBath | 475/338 |
| 7,042,110 B2 | 5/2006 | Mikhail et al. | 290/44 |
| 7,147,582 B2 * | 12/2006 | Mingishi et al. | 475/163 |
| 7,214,157 B2 * | 5/2007 | Flamang et al. | 475/159 |
| 7,335,128 B2 | 2/2008 | Flamang et al. | 475/331 |
| 2006/0138780 A1 | 6/2006 | Flamang et al. | 290/55 |
| 2007/0007769 A1 | 1/2007 | Basteck | 290/1 C |
| 2007/0142156 A1 | 6/2007 | Smook et al. | 475/166 |
| 2008/0269007 A1 * | 10/2008 | Cunliffe et al. | 475/347 |
| 2009/0058094 A1 * | 3/2009 | Jansen et al. | 290/55 |
| 2009/0170655 A1 * | 7/2009 | Seanz De Ugarte et al. | 475/331 |

FOREIGN PATENT DOCUMENTS

| | | |
|---|---|---|
| GB | 1299007 A | 6/1972 |
| WO | WO96/11338 A1 | 4/1996 |
| WO | WO02/14690 A1 | 2/2002 |
| WO | WO2007/135156 A1 | 11/2007 |

OTHER PUBLICATIONS

Ray J. Hicks, Frank Cunliffe and Urs Giger, *Optimised Gearbox Design for Modern Wind Turbines*, Orbital2 LTD, Mayo Hall Llangammarch Wells, POWYS, Wales, UK, pp. 1-8, Nov. 20, 2004.
H. Müller, M. Pöller, A. Basteck, M. Tilscher and J. Pfister, *Grid Compatibility of Variable Speed Wind Turbines with Directly Coupled Synchronous Generator and Hydro-Dynamically Controlled Gearbox*, Sixth Int'l. Workshop on Large-Scale Integration of Wind Power and Transmission Networks for Offshore Wind Farms, pp. 307-315, Oct. 26-28, 2006, Delft, NL.
Prof. Dr. Ir. D. Vandepitte and Prof. Dr. Ir. P. Sas, *Simulation of Dynamic Drive Train Loads in a Wind Turbine*, Katholieke Universiteit Leuven, PhD Dissertation Joris Peeters, Jun. 2006.
EP09173576 Search Report, Mar. 9, 2010.

* cited by examiner

*Primary Examiner* — Ha D. Ho
(74) *Attorney, Agent, or Firm* — Ann M. Agosti (57) ABSTRACT

A compound planetary gear transmission unit includes a second stage with axially staggered planets.

5 Claims, 7 Drawing Sheets

SPLIT TORQUE COMPOUND PLANETARY DRIVETRAIN FOR WIND TURBINE APPLICATIONS

BACKGROUND

The invention relates generally to wind turbines and more particularly to a compound planetary gear transmission unit interposed between a rotor of a wind turbine and an electrical generator.

Figure 1:
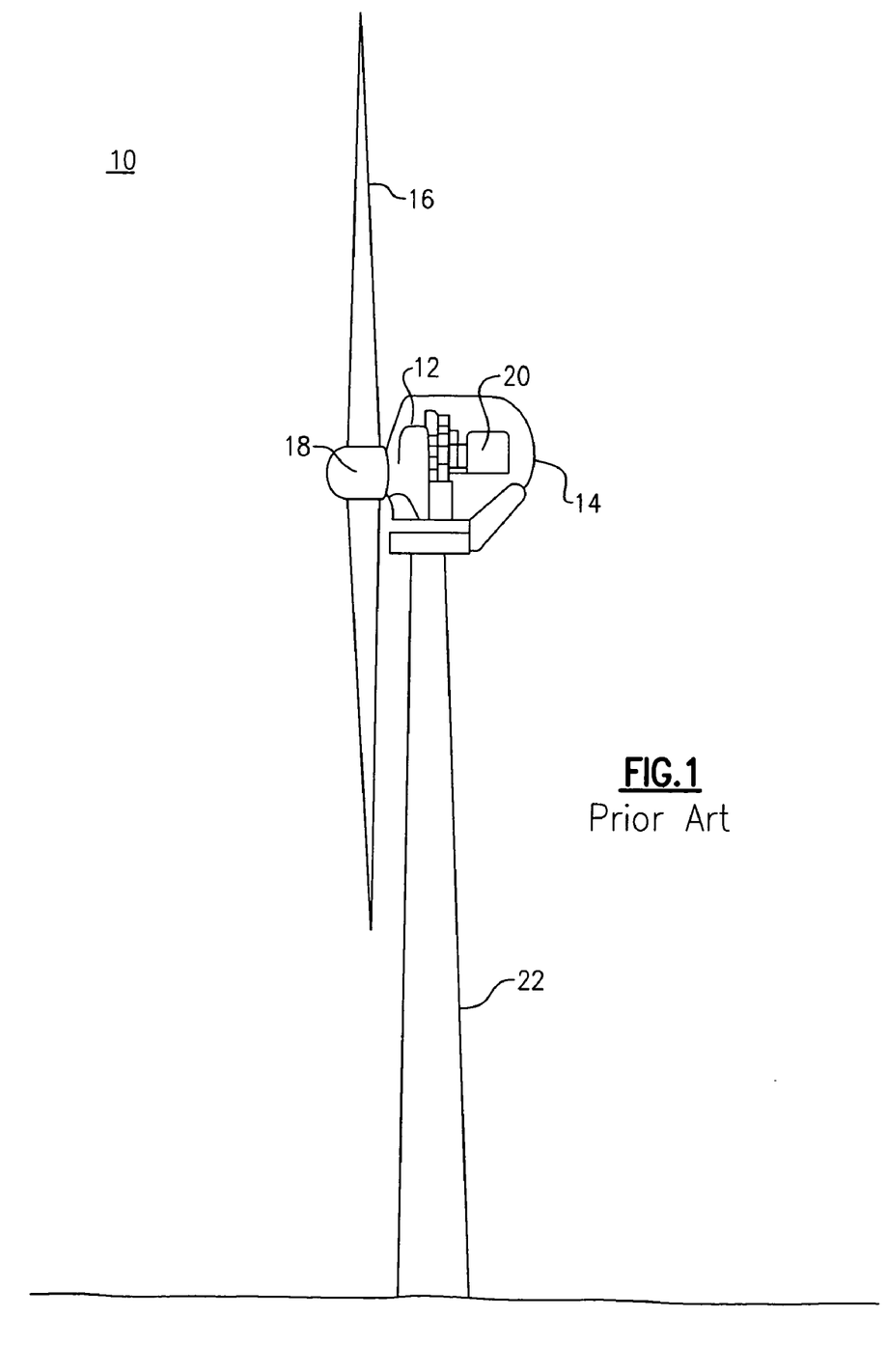
FIG. 1 illustrates a wind turbine including a planetary gear drive.

A wind turbine 10, illustrated in FIG. 1, comprises an epicyclic gear transmission unit 12 housed within and supported by a nacelle 14 in which the gear transmission unit 12 acts to transmit torque from rotor blades 16 and rotor hub 18 to an electrical generator 20.

The use of a planetary gearbox to drive an electric generator 20 in response to rotation of a rotor 16, 18 of a wind turbine is well known. The rotor provides a low speed, high torque input to the gear transmission unit 12.

Market forces are ever demanding wind turbines with higher power outputs at a lower cost, and greater reliability. As the power output requirements increase for wind turbines, the rotational speed of the rotor blades 16 usually decreases due to noise requirements. Consequently, the input torque to the gear transmission unit 12 increases in a non-linear fashion. The foregoing limitations result in gear transmission units that are heavier and more costly. Further, the wind turbine tower 22 mass needs to increase as well to accommodate the increased top mass due to the heavier gear transmission units, further increasing the mass and cost of the overall wind turbine system.

The foregoing issues of high torque, low input RPM have generally been addressed through conventional means that may include planetary arrangements with multiple stages many times including a high-speed offset gear. Conventional compound planetary configurations using three planets have also been employed; while one approach includes seven planets with flexible pins and a dual planetary system in which the input shaft drives the first stage planets as well as the ring gear of the second stage. The sun of the second stage, which includes five planets and flexible pins, drives the ring gear of the first stage. The sun of the first stage is directly connected to a large third stage gear that drives the output high-speed gear.

In view of the foregoing, it would be both advantageous and beneficial to provide a gear transmission unit having a torque density that is sufficient to substantially reduce the nacelle weight and the tower weight for a wind turbine beyond that achievable with existing wind turbine gear transmission units.

BRIEF DESCRIPTION

Briefly, in accordance with one embodiment, a compound planetary gear transmission unit comprises:
a stationary ring gear;
a planet carrier comprising at least one carrier arm, the planet carrier configured to rotate about a central axis of the ring gear in response to an input torque;
a first stage comprising a plurality of planets, each first stage planet configured to rotate about a corresponding pin axis in response to movement of at least one planet carrier arm, each first stage planet further configured to engage the stationary ring gear; and
a second stage comprising:
a first plurality of planets configured to rotate about the central axis, each planet within the first plurality of second stage planets engaging a corresponding pin associated with a first stage planet, and
a second plurality of planets configured to rotate about the central axis, each planet within the second plurality of second stage planets engaging a corresponding pin associated with a first stage planet, such that each first stage planet pin drives a single second stage planet, wherein the first plurality of second stage planets are axially staggered from the second plurality of second stage planets.

In accordance with another embodiment of the invention, a wind turbine gear box comprises:
a first stage comprising a plurality of planets engaging a stationary ring gear, each first stage planet configured to rotate about a corresponding pin axis in response to rotation of a wind turbine rotor; and
a second stage comprising:
a first plurality of planets configured to rotate about a central axis, each planet within the first plurality of second stage planets engaging a corresponding pin associated with a first stage planet, and
a second plurality of planets configured to rotate about the central axis, each planet within the second plurality of second stage planets engaging a corresponding pin associated with a first stage planet, such that each first stage planet pin drives a single second stage planet,
wherein the first plurality of second stage planets are axially staggered from the second plurality of second stage planets.

In accordance with yet another embodiment of the invention, a compound planetary gear transmission unit comprises:
a stationary ring gear meshed with more than three first stage planets; and
and a rotating carrier configured to engage the more than three first stage planets.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 2:
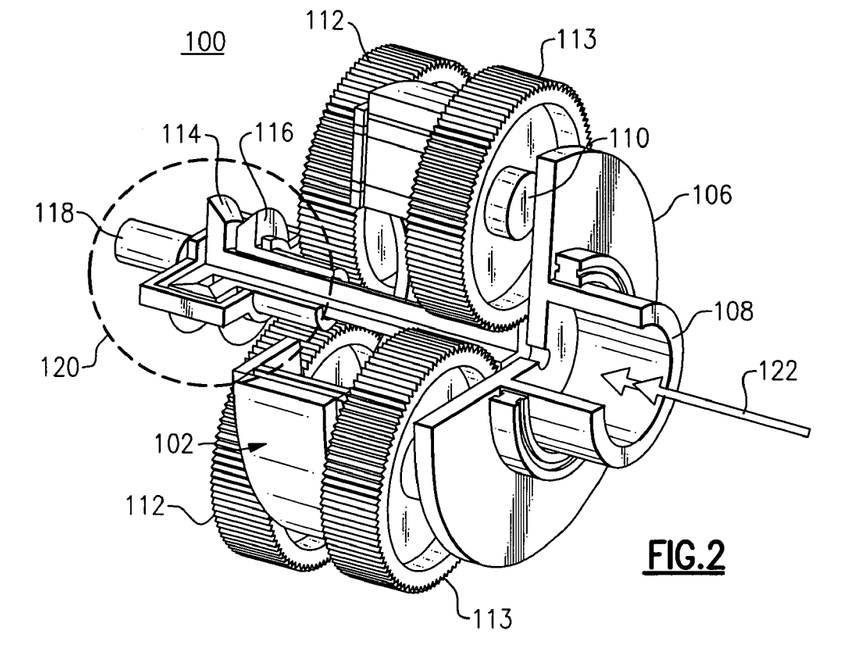
FIG. 2 is illustrates a split torque compound planetary gear drive, according to one embodiment of the invention.
Figure 3:
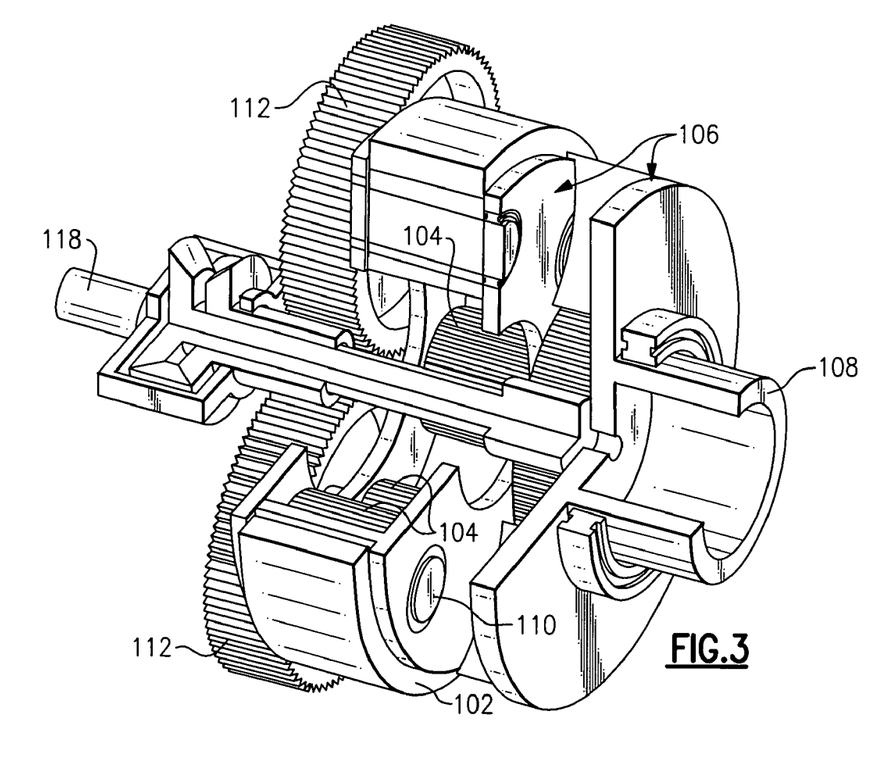
FIG. 3 illustrates further details of the planet carrier depicted in FIG. 2, according to one embodiment of the invention.

FIG. 2 illustrates a split torque compound planetary gear drive 100 according to one embodiment of the invention; while FIG. 3 illustrates further details of the planet carrier 106 depicted in FIG. 1, according to one embodiment of the invention. The gear drive 100 includes a fixed ring gear 102 meshed with more than three planets 104 and a rotating carrier 106. A first stage that includes a plurality of planets 104 is driven by an input shaft 108. The first stage drives a second stage through common gear shafts (pins) 110. In turn, second stage planets 112, 113 mesh with one or more suns 114, 116 as an output shaft 118.

More specifically, and with continued reference to FIGS. 2 and 3, the split torque compound planetary gear drive 100 comprises a stationary ring gear 102. A planet carrier 106 comprising at least one carrier arm is configured to rotate about a central axis 122 of the ring gear 102 in response to an input torque applied to the planet carrier 106.

A first stage comprises a plurality of planets 104. Each first stage planet 104 is configured to rotate about a corresponding pin 110 axis in response to movement of at least one planet carrier arm. Each first stage planet 104 is further configured to engage the stationary ring gear 102.

A second stage comprises a first plurality of planets 112 configured to rotate about a first axis. Each planet 112 within the first plurality of second stage planets 112 engages a corresponding pin 110 associated with a first stage planet 104. A second plurality of second stage planets 113 is also configured to rotate about the first axis. Each planet within the second plurality of second stage planets 113 also engages a corresponding pin 110 associated with a first stage planet 104, such that each pin 110 drives only one of the second stage planets 112, 113.

The first stage planets 104 can be mounted via a flexible element or flex-pin 110 to facilitate better load sharing between planets by allowing each planet gear to rotate in an axis parallel to the gear transverse plane to improve load sharing between planets 104 and/or the ring gear 102. Flex-pins are known in the gear drive art, and so details regarding flex-pins are not discussed in further detail herein to preserve brevity and enhance clarity regarding other aspects of the embodiments described herein.

The second stage comprising a first plurality of planets 112 and a second plurality of planets 113 is configured such that the first plurality of planets 112 is staggered axially from the second plurality of planets 113. This structure allows for an increase in the number of first stage planets as well as maximization of the second stage planet gear pitch diameter, thus maximizing the gear drive overall ratio while keeping the weight and possibly system cost to a minimum.

A first sun 114 rotates about the central axis 122 and engages the second plurality of second stage planets 113. A second sun 116 rotates about the central axis 122 in a coaxial relationship with the first sun 114 and engages the first plurality of second stage planets 112.

A torque differential mechanism 120 is configured to transfer torque from both the first and second suns 114, 116 to an output shaft 118. The present invention is not so limited however, and the torque differential mechanism 120 can just as easily be replaced by other torque differential mechanisms to achieve equalization of torque differences between the two sets of second stage planets 112, 113. Minimization of timing issues and load sharing between the second stage planet gears 112, 113 and the corresponding sun 114, 116 can optionally be achieved via sun teeth that are timed to offset the differences.

Figure 4:
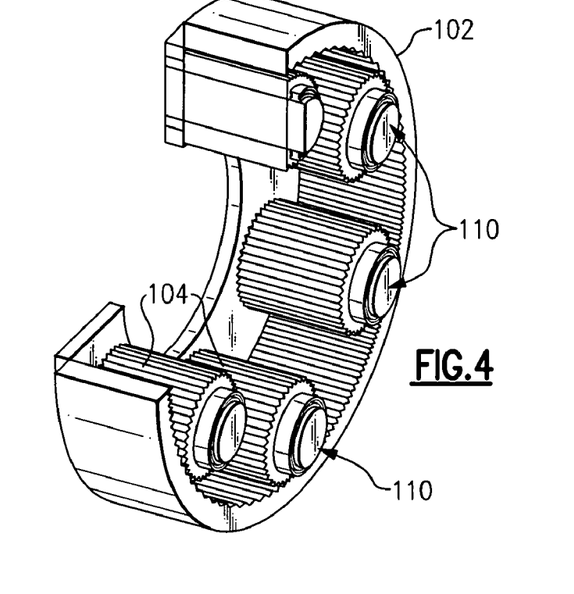
FIG. 4 illustrates further details of the ring gear depicted in FIG. 2, according to one embodiment of the invention.

FIG. 4 illustrates further details of the ring gear 102 depicted in FIG. 1, according to one embodiment of the invention. A plurality of first stage planets 104 is shown engaging the stationary ring gear 102. The ring gear 102 is configured to engage six first stage planets 104, although only four of the first stage planets 104 are depicted in order to provide greater clarity of details. The present invention is not so limited however, and other embodiments having more or less than six first stage planets 104 can just as easily be employed to achieve the principles set forth herein.

Figure 5:
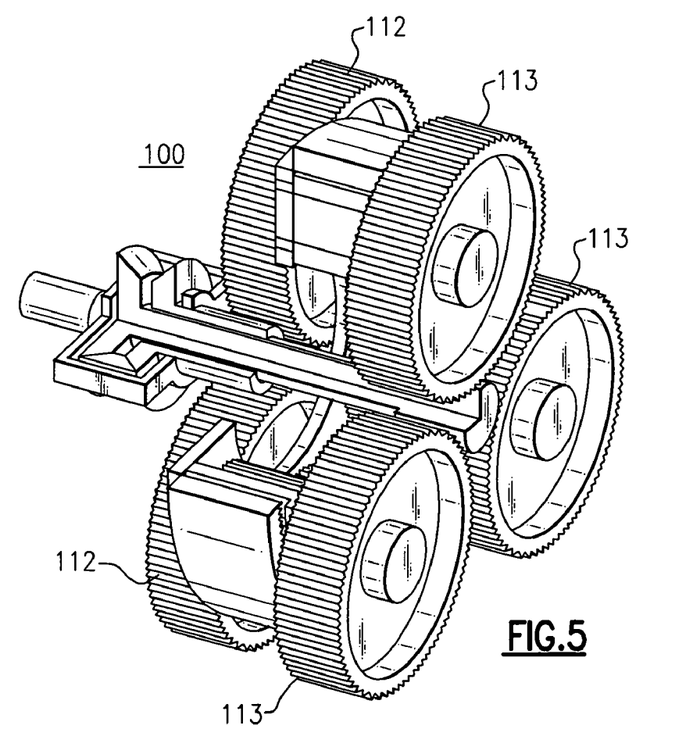
FIG. 5 illustrates further details of the second planets depicted in FIG. 2, according to one embodiment of the invention.

FIG. 5 illustrates further details of the second planets 113 depicted in FIG. 1, according to one embodiment of the invention. The split torque compound planetary gear drive 100 is configured to employ three second stage planets 112 that are axially offset from three second stage planets 113. Only two of the second stage planets 112 are shown for clarity of detail. The number of second stage planets 112, 113 can just as easily be greater or less than shown when the gear drive 100 is appropriately configured with more or less first stage planets 104.

Figure 6:
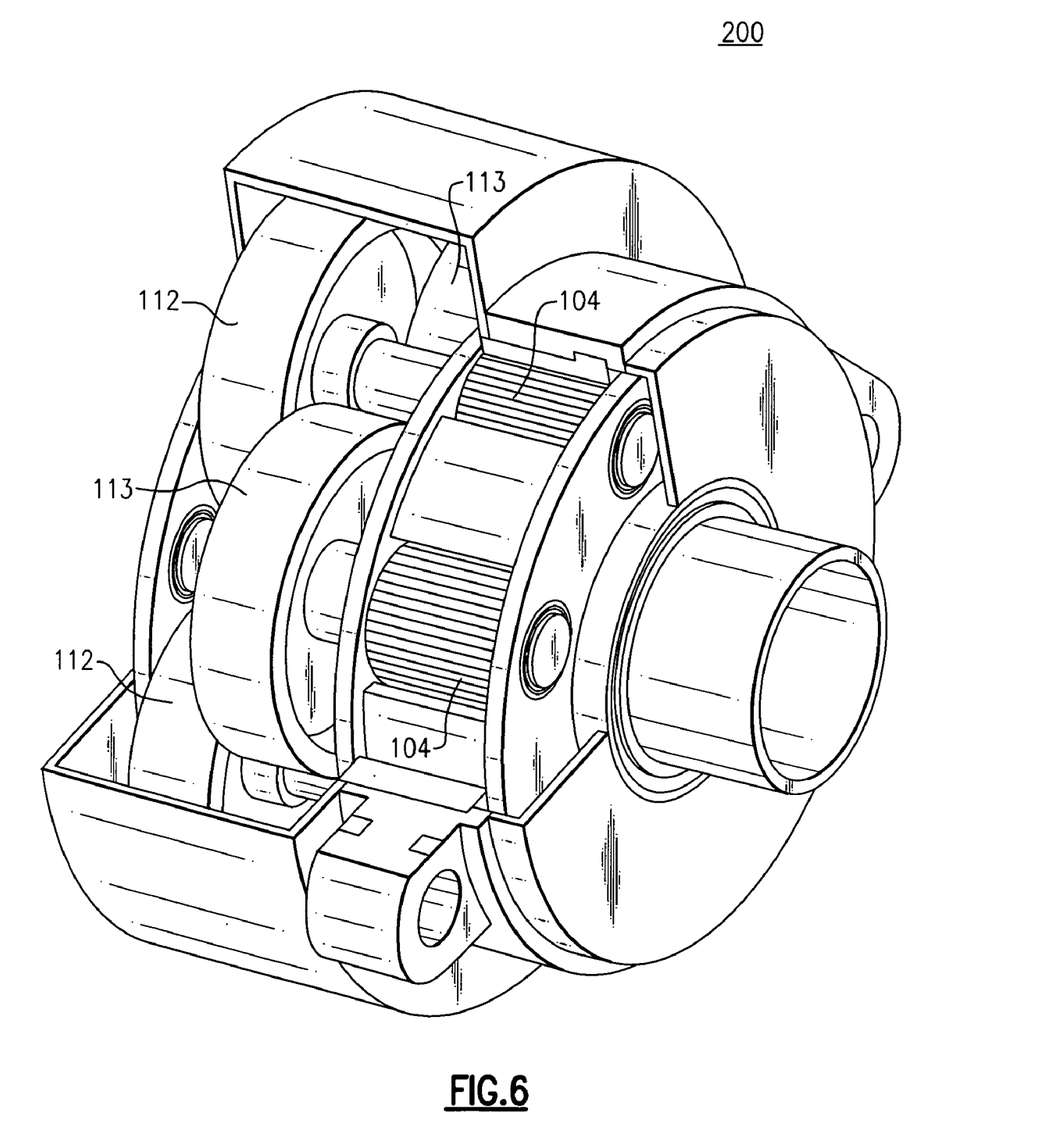
FIG. 6 illustrates a split torque compound planetary gear drive, according to another embodiment of the invention.

FIG. 6 illustrates a split torque compound planetary gear drive 200 according to another embodiment of the invention. Gear drive 200 however differs from gear drive 100 in that while gear drive 100 locates each set of the second stage planets 112, 113 on opposite sides of the first stage planets 104, gear drive 200 locates both sets of second stage planets 112, 113 on one common side (downwind) of the first stage planets 104.

In summary explanation, particular embodiments of a split torque compound planetary gear drive having more than three second stage planets and more than three first stage planets have been described above. The embodiments provide a split torque compound planetary gear drive that maximizes the gear ratio between the first and second stage, while increasing the number of planets to greater than three to reduce the torque load on each planet. Distinct sets of second stage planet gears are located in different axial planes to increase the torque density (torque/weight) of the gear drive. Some embodiments can provide up to about a 20% weight reduction over existing gear drives, while reducing the load on each planet.

Figure 7:
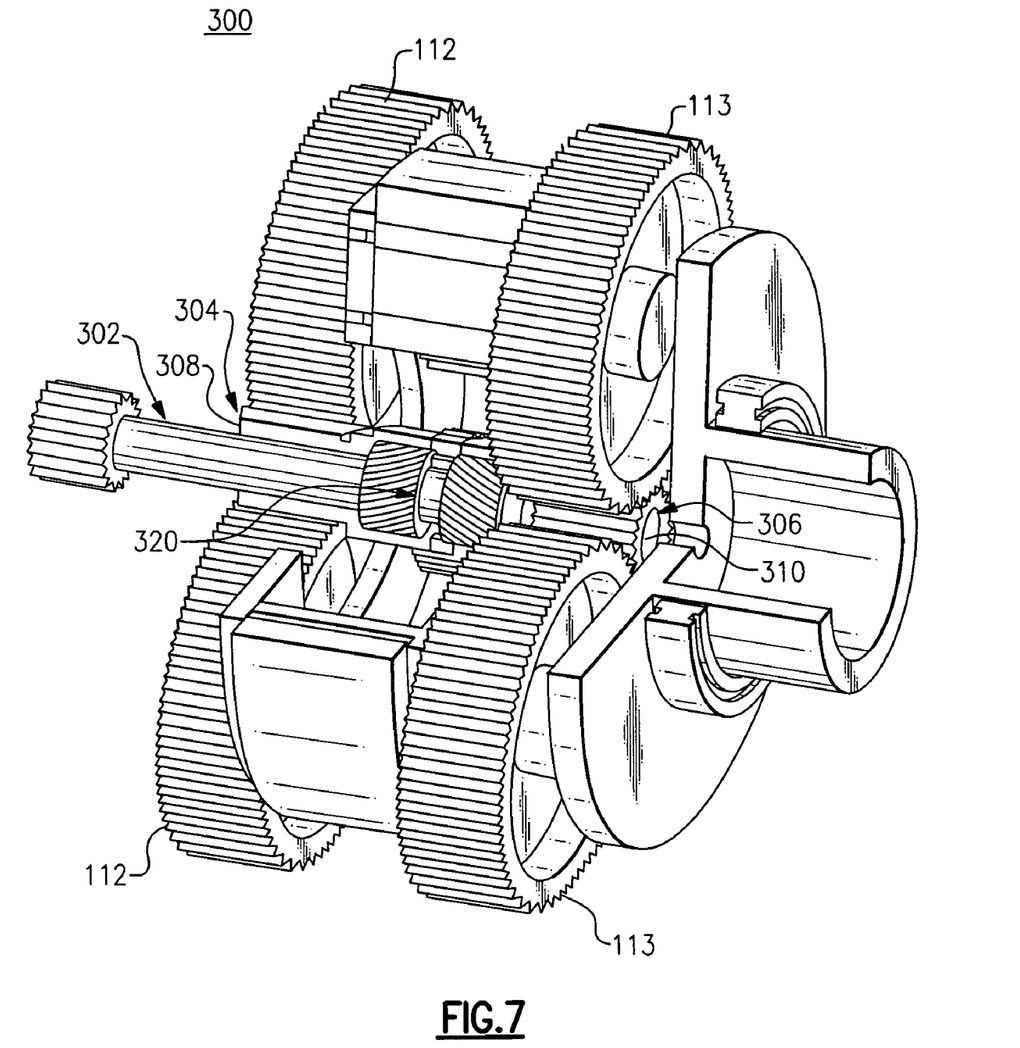
FIG. 7 illustrates a split torque compound planetary gear drive, according to yet another embodiment of the invention.

FIG. 7 illustrates a split torque compound planetary gear drive 300, according to yet another embodiment of the invention. Split torque compound planetary gear drive 300 is similar to split torque compound planetary gear drive 100 described above, except gear drive 300 employs a double helical gear coupling 302 that is different from torque differential mechanism 120 depicted in FIG. 2. Gear coupling 302, described in more detail below, operates to equalize the torque between the two sets of second stage planets 112, 113. Gear drive 300 also includes a first sun 304 that meshes with the first plurality of second stage planets 112 and a second sun 306 that meshes with the second plurality of second stage planets 113. The first sun 304 and second sun 306 operate to correct angular differences that may exist between the first and second plurality of planets 112, 113 that may be caused by manufacturing tolerances, deflection of material(s), and so on. Each sun 304, 306 includes a set of corresponding external teeth 308, 310 that meshes with a corresponding set of second stage planets, and also includes a set of corresponding internal teeth 312, 314 as seen in FIG. 8.

Figure 8:
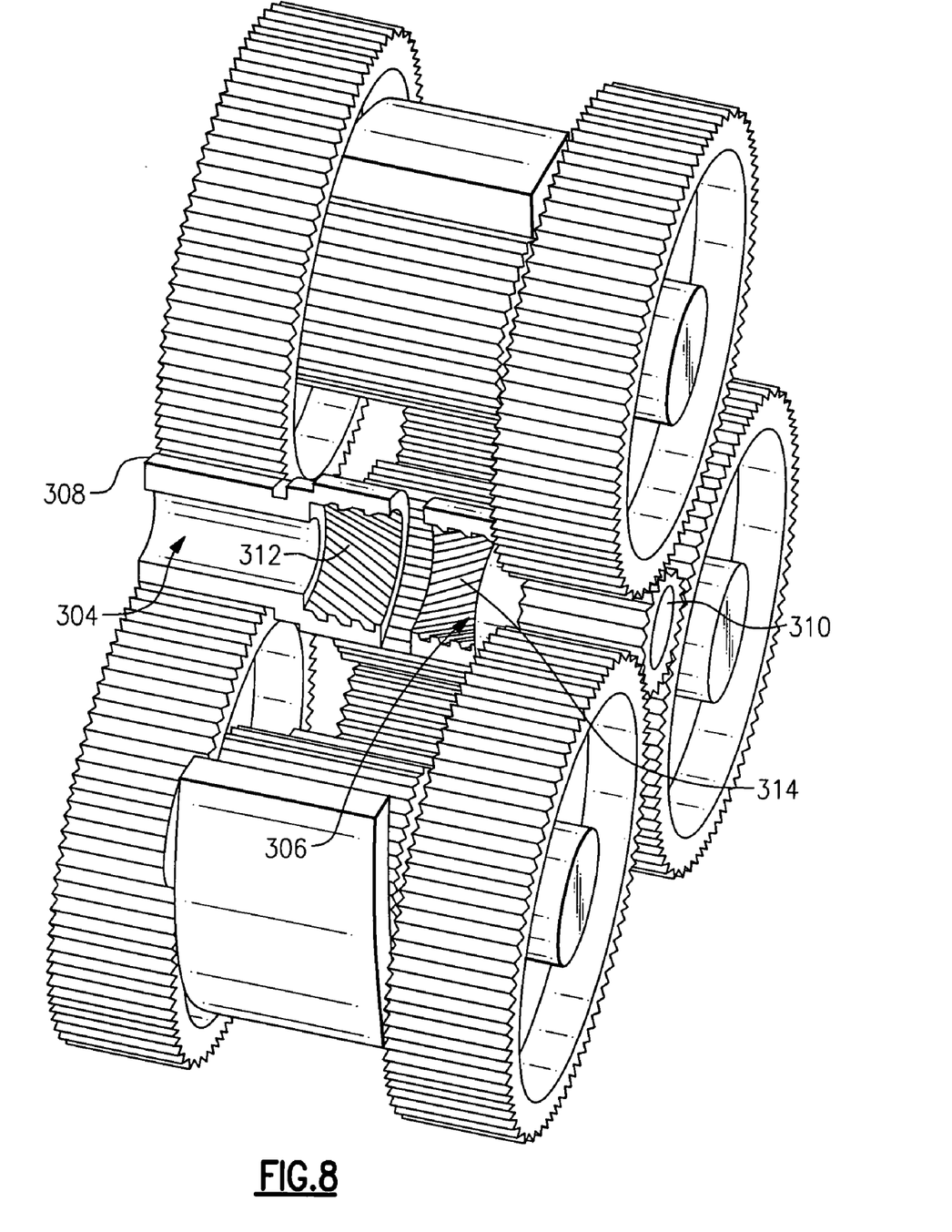
FIG. 8 illustrates further details of the internal helical gear suns depicted in FIG. 7, according to one embodiment of the invention.
Figure 9:
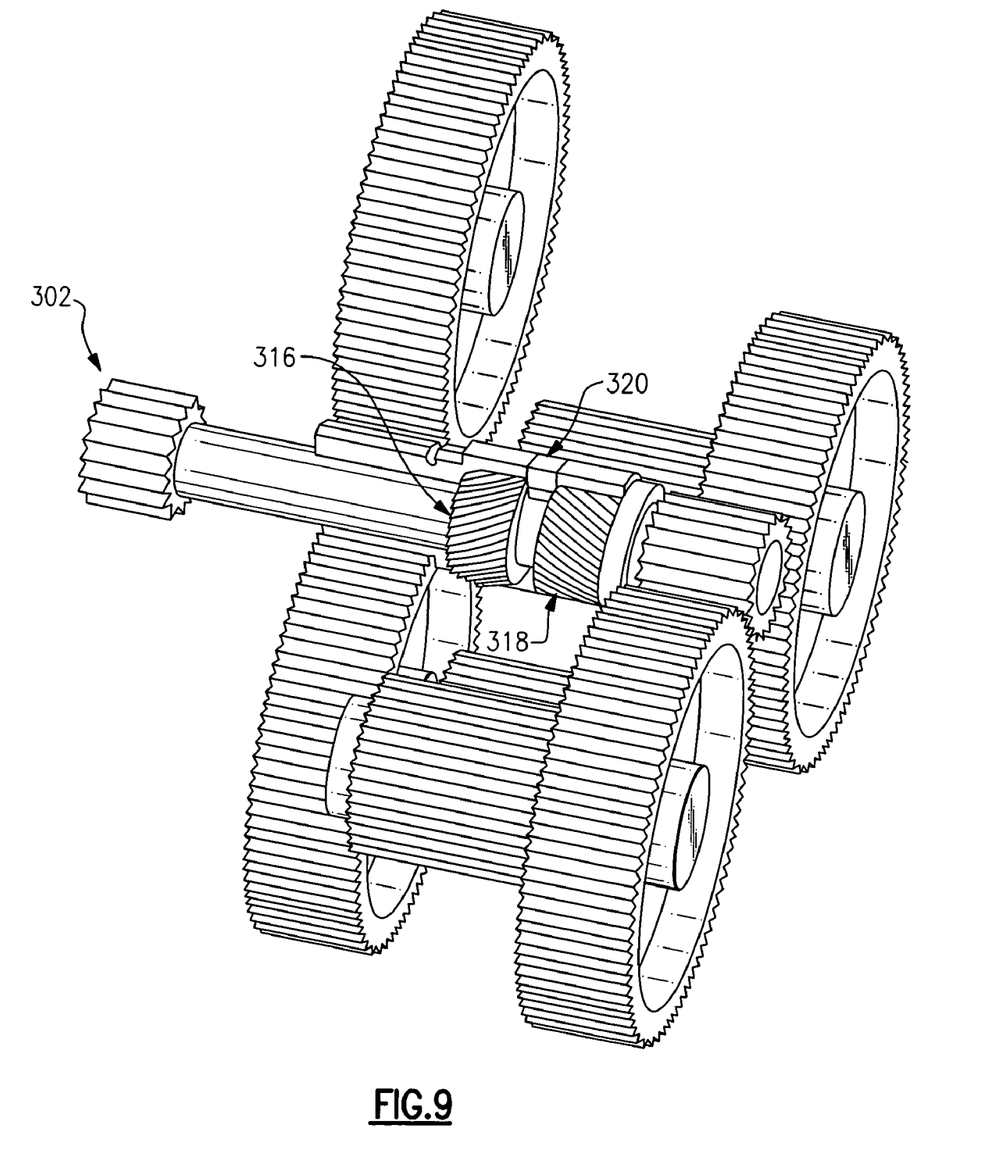
FIG. 9 illustrates further detail of the double helical coupling mechanism depicted in FIG. 7, according to another embodiment of the invention.

FIG. 8 illustrates further details of the suns 304, 306 depicted in FIG. 7, according to one embodiment of the invention. Sun 304 includes a set of internal teeth 312 that are configured to mesh with a first set of helical coupling gears 316 as seen in FIG. 9. Sun 306 includes a set of internal teeth 314 that are configured to mesh with a second set of helical coupling gears 318 as also seen in FIG. 9.

FIG. 9 illustrates further details of the double helical coupling mechanism 302 depicted in FIG. 7, according to another embodiment of the invention. Double helical coupling mechanism 302 includes a first set of helical coupling gears 316 and a second set of helical coupling gears 318 as stated above. Double helical coupling mechanism 302 is configured with a suitable mechanism such as, without limitation, an axial spring or flexible mechanism 320 that operates to stabilize the double helical coupling mechanism 302 and provide a shift feature to accommodate timing differences that may exist between the first and second suns 304, 306. Coupling mechanism 302 will therefore be allowed to operate by shifting axially in a self-aligning manner to accommodate timing differences caused by differences that may exist between the inclined planes associated with the helical gearing described herein.

Double helical coupling mechanism 302 advantageously reduces the number of bearings that may be required to implement other types of coupling mechanisms such as the torque differential mechanism 120 shown in FIG. 2 that is configured to transfer torque from a plurality of suns 114, 116 to an output shaft 118. Double helical coupling mechanism 302 further advantageously reduces the number of component parts required to achieve self-alignment, reduce production costs, enhance reliability, and simplify manufacturing processes.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A compound planetary gear transmission unit comprising:
    a stationary ring gear meshed with more than three first stage planets;
    a rotating carrier configured to engage the more than three first stage planets;
    a first plurality of second stage planets driven by a first plurality of the more than three first stage planets; and
    a second plurality of second stage planets axially staggered from the first plurality of second stage planets, the second plurality of second stage planets driven by a second plurality of the more than three first stage planets.

2. The compound planetary gear transmission unit according to claim 1 further comprising:
    a first sun rotatable about a central axis and engaging the first plurality of second stage planets;
    a second sun rotatable about the central axis in a coaxial relationship with the first sun and engaging the second plurality of second stage planets; and
    a torque transfer mechanism configured to transfer torque from both the first and second suns to an output shaft.

3. The compound planetary gear transmission unit according to claim 2 wherein the torque transfer mechanism comprises a differential gear system configured to equalize torque differences transmitted to the output shaft by the first and second suns.

4. The compound planetary gear transmission unit according to claim 2, wherein the torque transfer mechanism is configured to offset timing differences between the first and second suns.

5. The compound planetary gear transmission unit according to claim 2, wherein the torque transfer mechanism comprises a double-helical coupling mechanism configured to equalize torque differences transmitted to the output shaft by the first and second suns.

\* \* \* \* \*